United States Patent

Langston

[11] Patent Number: 5,111,838
[45] Date of Patent: May 12, 1992

[54] DUNNAGE BAG AIR VALVE AND COUPLING

[75] Inventor: Lonnie W. Langston, Crossett, Ark.
[73] Assignee: Shipping Systems, Inc., Monroe, La.
[21] Appl. No.: 796,778
[22] Filed: Nov. 25, 1991
[51] Int. Cl.⁵ .......................... B65B 1/18; F16L 37/28
[52] U.S. Cl. ................... 137/223; 251/149.5; 141/348; 141/386; 410/119; 410/125
[58] Field of Search ............ 251/149.5; 137/223; 410/119, 125, 128; 141/348, 349, 350, 383, 384, 386; 285/200, 205, 206, 330, 360, 361

[56] References Cited

U.S. PATENT DOCUMENTS

| | | | |
|---|---|---|---|
| 2,764,428 | 9/1956 | Murphy | 285/330 X |
| 3,808,981 | 5/1974 | Shaw | 410/119 |
| 3,960,281 | 6/1976 | Reeves | 410/119 |
| 4,073,389 | 2/1978 | Angarola et al. | 137/223 X |
| 4,146,070 | 3/1979 | Angarola et al. | 137/223 X |
| 4,732,415 | 3/1988 | Matin et al. | 285/360 X |
| 4,746,149 | 5/1988 | Thompson | 285/361 X |
| 5,082,244 | 1/1992 | Krier et al. | 410/125 X |

Primary Examiner—George L. Walton
Assistant Examiner—Kevin L. Lee
Attorney, Agent, or Firm—Stephen R. Doody; Peter C. Michalos

[57] ABSTRACT

A dunnage bag valve and coupling arrangement comprises a valve stem having a spring loaded valve member which is movable to open a passage through the stem. A pair of circumferentially extending, diametrically opposed slots are formed on opposite sides of the stem. An axially extending opening is provided at one end of each slot for receiving a lug. A pair of lugs are formed on the inner cylindrical portion of a coupling so that the coupling can be pressed onto the stem and twisted, the lugs being introduced into the slot openings and then riding along the circumferential portions of the slots. An air hose is threaded to the coupling so that compressed air can be introduced through the valve stem into the dunnage bag. A fixed post inside the coupling opens the valve member when the coupling is engaged to the valve stem. To prevent rotation of the stem, teeth at the base of the stem engage teeth on the ring of a handle that is held while the coupling is pushed and twisted onto the valve stem.

19 Claims, 2 Drawing Sheets

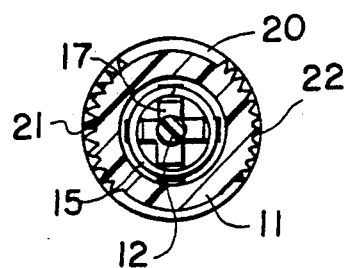
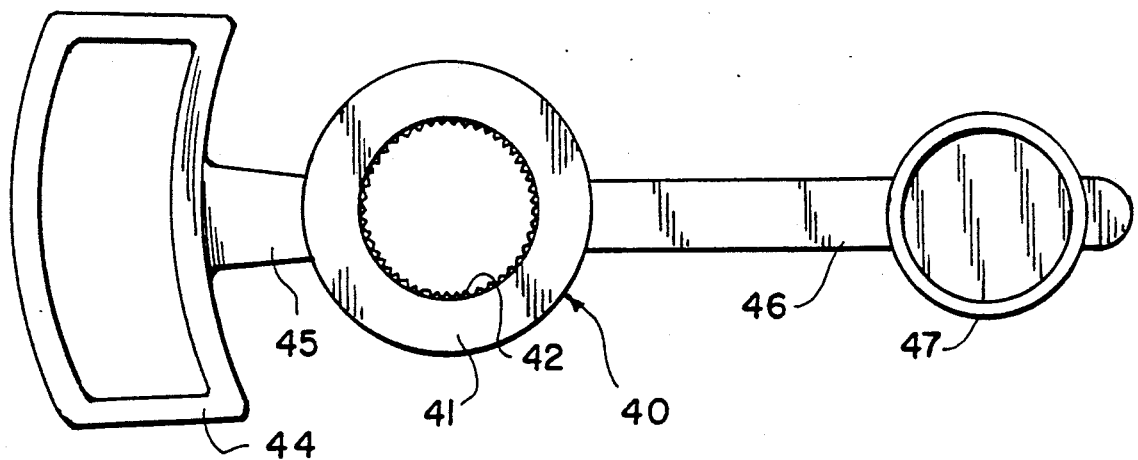

DUNNAGE BAG AIR VALVE AND COUPLING

FIELD AND BACKGROUND OF THE INVENTION

The present invention relates in general to inflatable dunnage bags for use in shipping freight by rail, ship, truck, aircraft and the like, and in particular to a new and useful air valve and coupling arrangement for an inflatable dunnage bag.

Known dunnage bags comprise an inner bladder of plastic, typically polyethylene, surrounded by several layers of reinforced paper. A valve arrangement is provided in the wall of the dunnage bag for facilitating inflation of the bag with air.

In use, a dunnage bag is placed in a space between cargo and inflated to firmly hold the cargo for transportation.

It is known to utilize a handle near the air valve for holding the valve while it is being inflated. See, for example, U.S. Pat. No. 4,073,389.

To inflate a dunnage bag, the coupling at the end of an air hose is normally manually pressed and held against the dunnage bag air valve. This simultaneously depresses a spring loaded valve member to open the valve, and seals the coupling between the air hose and the air valve. The air hose coupling must be firmly held against the valve during the entire inflation process to maintain this seal. See, for example, U.S. Pat. Nos. 4,146,069 and 4,146,070.

Since the dunnage bag air valve is often in an awkward position, and considerable force must be exerted to hold the air hose against the air valve, a metal air hose coupling has been developed which includes a sleeve that engages around the plastic stem of the dunnage bag air valve. Inwardly movable teeth are activated by a ring on the metal coupling to bite into the plastic valve stem, to hold the coupling to the stem. While this arrangement has been partly successful in maintaining a firm and sealed coupling between the air hose and the air valve, the coupling is not entirely secure and often falls from the valve during the inflation process. The coupling is also complex, heavy and expensive.

It is known to provide a mechanism for firmly holding an inflation coupling to a valve stem. See, for example, U.S. Pat. No. 3,087,518. A quick connect or bayonet type push and twist engagement between a cap and a container or container stem is also known. See, for example, U.S. Pat. No. 3,072,276. The use of a push and twist bayonet connection is also known in the field of air valves in general, from U.S. Pat. No. 3,536,117.

Nothing in the prior art, however, teaches a simple, inexpensive yet effective valve and coupling arrangement for a dunnage bag which easily and self-supportingly engages an air hose to the valve and, after the bag is inflated, easily and quickly disconnects the air hose.

SUMMARY OF THE INVENTION

An object of the present invention is to provide a dunnage bag air valve arrangement which includes an air hose coupling that can easily, conveniently and positively be locked to the air valve during the entire inflation process, and thereafter be quickly disengaged.

The present invention comprises a specialized coupling arrangement for a dunnage bag air valve which permits the quick connection of an inflation hose coupling to the valve in the dunnage bag wall. The coupling is engaged to a stem of the valve by a press-and-twist action, conventionally known as a "bayonet" connection. An axially extending post within the coupling depresses a spring loaded valve member in the valve stem. The valve member has a rubber washer which, under the influence of a spring, presses against a valve seat in the valve stem to close the valve. By engaging the coupling onto the valve stem, the valve member is depressed to open the air passage through the stem. The quick connection between the coupling and the stem is achieved by a pair of slots which extend circumferentially and partly around the valve stem and on opposite sides of the valve stem. Each slot has an upwardly open end for receiving opposite lugs which project inwardly from the inner circumference of the coupling. Engagement is achieved by aligning the lugs with the slot openings, pushing the coupling in an axial direction onto the stem, then twisting the coupling by approximately 90° to firmly seat the coupling against the stem.

A set of axially extending circumferentially spaced teeth are provided around the base of the stem immediately adjacent the wall of the bag. These teeth are embraced by an internally toothed ring. Firm engagement between the stem teeth and the ring teeth hold the ring against the bag and keep it from rotating. A handle is provided at one side of the ring and a strap is provided on the opposite side of the ring. A closing cap is integrally formed at the end of the strap and can be used to close the stem by pressing the cap onto the stem.

The coupling has an internal thread for receiving the threaded end of an air hose or air hose coupling.

The dunnage bag itself is formed of an inner heavy plastic layer and a plurality (6) of heavy cardboard layers over the plastic inner layer. The valve stem pierces all layers of the bag and has an inner flange which is sealed around the opening and to the plastic inner layer.

Accordingly, a further object of the present invention is to provide a dunnage bag and air valve arrangement combination which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a sectional view taken along line 3—3 of FIG. 2; and

FIG. 4 is a top plan view of a one-piece ring, cap and handle portion of the present invention.

DESCRIPTION OF THE PREFERRED EMBODIMENTS

Figure 1:
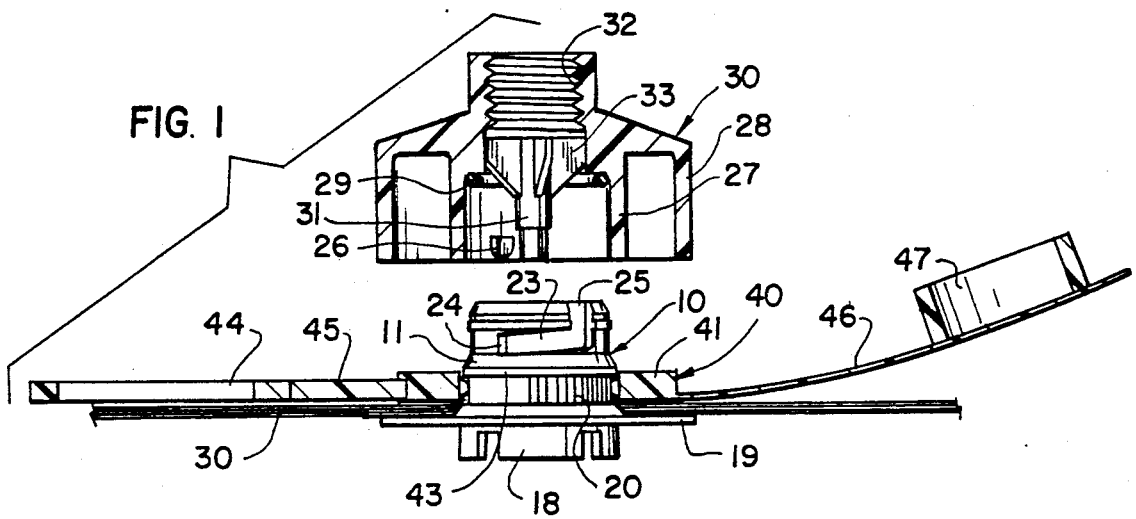
FIG. 1 is a partly sectional, exploded view of a dunnage bag air valve and coupling arrangement embodying the present invention.
Figure 2:
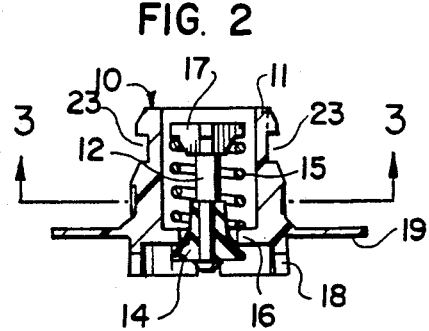
FIG. 2 is a sectional view of the valve stem and valve element of the invention.

Referring to the drawings in particular, the invention embodied in FIG. 1 comprises an air valve generally designated 10 which pierces one inner plastic and multiple, for example six, outer paper layers forming a dunnage bag wall 30. As best shown in FIG. 2, valve 10 comprises a valve stem 11 made of strong synthetic or plastic material such as nylon. A valve member 12 is mounted for axially movement through the hollow center of stem 11. A soft synthetic or rubber washer 14 mounted around a lower end of valve member 12 is pressed by a spring 15 against the lower surface of a valve seat 16 carrying a passage through the center of the valve stem. As shown in FIGS. 2 and 3, the upper end of stem 12 carries a star 17. Spring 15 which is a strong compression spring, is seated between the lower surface of valve star 17 and the upper surface of valve seat 16, to urge the valve member 12 in a normally closed position.

A flared, generally axially extending and slotted projection or spacer 18 is formed at the bottom of stem 11 to establish a distance between opposite walls of the dunnage bag when the dunnage bag is not inflated, so that air to be supplied through the valve 10, has an easy passage into the bag during the initial phases of inflation.

A radially extending flange 19 extends outwardly of the stem 11 above spacer 18. The base of the stem 11 above flange 19 has an annular groove 20 which, as shown in FIG. 3, carries two sets of radially projecting teeth 21 and 22 which are spaced from each other by toothless areas around the circumference of groove 20. The interruption in the teeth facilitates an easier casting of the valve stem 11 from one piece of nylon or other synthetic material. It also facilitates engagement of a toothed ring to be described later, for retaining the stem on the multiple layers forming the dunnage bag wall 30.

As best shown in FIGS. 1 and 2, the upper end of the generally cylindrical stem 11, carries a pair of slots 23. The slots are positioned opposite from each other around the circumference of stem 11. Each slot has a circumferential portion which is inclined slightly in the axial direction, and extends around approximately 90 degrees of the stem's circumference. As best shown in FIG. 1, each circumferentially extending portion has a closed end 24 and an opposite open end 25 which extends axially and opens through the end of the stem 11 for receiving an inwardly extending lug 26 formed on the inner circumference of a coupling generally designated 30. Coupling 30 includes an inner cylindrical sleeve 27 which carries a pair of oppositely positioned lugs 26 (one of which is shown at FIG. 1). Each lug extends radially and is downwardly rounded to facilitate its entry into a respective slot opening 25.

Coupling 30 includes a pair of opposite wings 28 to make it easier to twist the cap once it has been pressed down onto stem 11 with lugs 26 in respective slots 23. Twisting the cap causes the lugs to slide around and downwardly onto the stem by virtue of the inclined extension of the slots 23. A rubber O-ring 29 is at the upper end of cylinder 27 for sealing against the top edge of stem 11 to seal the coupling to the valve. By pressing coupling 30 down onto stem 11, a valve opening post 31 centrally positioned within cylinder 27 presses down on the valve star 17. This compresses spring 15 and disengages washer 14 from valve seat 16, opening the valve. An air hose (not shown) is threaded to an internally threaded end 32 of the coupling 30 for providing a supply of compressed air to inflate the dunnage bag.

Four fins 33 extend inwardly from the hollow interior of the coupling and connect to the post 31 for holding the post in a fixed position, while at the same time, providing space for the passage of air through the coupling.

To fix valve 10 to dunnage bag wall 30, a ring generally designated 40 is utilized. As shown in FIGS. 1 and 4, ring 40 includes a ring portion 41 having a central opening with inwardly directed circumferentially distributed teeth 42. As shown in FIG. 4, teeth 42 are each wedged shaped and extend radially inwardly into engagement with the teeth 21 and 22 on the outer circumference of the stem base. To fix the valve in place, ring portion 41 is pressed over the end of stem 11 and passes a step 43 which makes it difficult or impossible to remove the ring once it is in place. To further seal the inner space of the dunnage bag, flange 19 may be cemented or fused or otherwise sealed to the inner plastic lining of the bag wall.

The engagement of teeth 42 with teeth 21 and 22 act as anti-rotation means between the ring and the valve.

To engage coupling 30 to valve 10, one holds handle means in the form of a handle 44 connected by a strap 45 to the ring portion 41. By virtue of the anti-rotation means, the valve 10 is held from rotation while the coupling 30 is first pressed and then twisted onto the valve stem to fix and seal the coupling to the valve. Without anti-rotation means, the valve would tend to rotate and become dislodged from the dunnage bag wall. This rotation would also make it difficult to secure the coupling to the valve.

A second strap 46 connected to ring portion 41 on an opposite side from the handle 44, carries a cap 47 which is shaped to engage over and close the top of stem 11, after the dunnage bag has been inflated and the coupling 30 disconnected.

While a specific embodiment of the invention has been shown and described in detail to illustrate the application of the principles of the invention, it will be understood that the invention may be embodied otherwise without departing from such principles.

What is claimed is:

1. A dunnage bag valve and coupling arrangement comprising:

a dunnage bag wall for defining a dunnage bag enclosure, said wall having an opening therethrough;

a valve having a valve stem extending through said opening, said stem defining an inner air passage through said wall with a valve seat in said passage, said valve including a valve member movablly mounted in said stem and engageable against said seat for closing said seat, said valve member being movable for opening said seat, said stem including at least one slot extending circumferentially around at least a portion of said stem, said slot having a substantially axially extending open end;

a coupling including a cylindrical portion for engagement over said stem, said cylindrical portion including at least one inwardly extending lug for engaging into said open end of said slot and, with rotation of said coupling, movable circumferentially along said slot for connecting said coupling to said stem, said coupling including a valve opening post positioned for engagement with said valve member once the coupling is connected to said stem, for moving said valve member to open the inner air passage through said stem;

handle means engageable with said stem for holding said stem when said coupling is pressed and rotated to connect said coupling to said stem; and anti-rotation means connected between said handle means for precluding rotation of said stem when said handle is held and said coupling is rotated.

2. An arrangement according to claim 1, wherein said anti-rotation means comprise a plurality of teeth circumferentially distributed around said stem at a location spaced from said slot, said handle means including a ring having an opening therethrough for engagement onto said stem, said ring including inwardly extending circumferentially distributed teeth in said ring opening for engaging the teeth of said stem.

3. An arrangement according to claim 2, wherein the circumferential portion of said slot is inclined in the axial direction so that rotation of said coupling causes said coupling to move axially and further toward said stem.

4. An arrangement according to claim 3, wherein said lug is downwardly rounded for facilitating entry of said lug into the opening of said slot.

5. An arrangement according to claim 4, wherein said valve includes a flange extending radially outwardly of said stem and fixed to said dunnage bag wall, said anti-rotation means being on an outer side of said stem with respect to said wall, said stem including a spacer on an inner side of said stem with respect to said flange.

6. An arrangement according to claim 5, wherein said spacer is substantially cylindrical and includes a plurality of slots circumferentially spaced therearound for the passage of air.

7. An arrangement according to claim 6, wherein said spacer is slightly flared outwardly from said flange to a lower end of said spacer.

8. An arrangement according to claim 2, wherein the teeth on said ring are wedged shaped.

9. An arrangement according to claim 8, wherein the teeth on said stem are interrupted around the circumference of said stem.

10. An arrangement according to claim 9, wherein said stem includes a step between said slot and said teeth for retaining said ring on said teeth.

11. An arrangement according to claim 10, wherein the circumferential portion of said slot is inclined in the axial direction so that rotation of said coupling causes said coupling to move axially and further toward said stem.

12. An arrangement according to claim 11, wherein said lug is downwardly rounded for facilitating entry of said lug into the opening of said slot.

13. An arrangement according to claim 12, wherein said valve includes a flange extending radially outwardly of said stem and fixed to said dunnage bag wall, said anti-rotation means being on an outer side of said stem with respect to said wall, said stem including a spacer on an inner side of said stem with respect to said flange.

14. A valve and coupling arrangement for a dunnage bag having a dunnage bag wall with a hole therethrough, comprising:
- a valve stem extending through said dunnage bag wall hole and having a base extending outwardly of the wall and carrying teeth around said base;
- a retaining ring having an opening for receiving said base, said ring having a plurality of teeth extending radially inwardly of the opening in said ring and engaged with the teeth of said base for preventing relative rotation between said ring and said stem;
- a handle connected to said ring for facilitating the holding of said valve stem;
- a pair of diametrically opposed circumferentially extending slots extending partly around said stem, above said stem base, each slot having a closed end at an opposite open end, the open end of each slot extending axially for receiving a lug; and
- a coupling having a cylindrical portion with a pair of inwardly extending lugs, each lug engageable into an opening of one slot and, with rotation of said coupling, each lug being movably circumferentially in each respective slot for engaging said coupling to said stem.

15. An arrangement according to claim 14, wherein said circumferential portions of said slots are inclined slightly in an axial direction of said stem so that rotation of said coupling further tightens an engagement between said coupling and said stem.

16. An arrangement according to claim 15, including a strap connected to said ring and a cap fixed to said strap for closing said stem when said coupling is disconnected from said stem.

17. An arrangement according to claim 16, wherein the teeth of said ring are wedged shaped, said stem including a step between said slots and said base for retaining said ring on said base.

18. An arrangement according to claim 17 including a flange extending outwardly of said stem for connection to the dunnage bag wall to fix said stem to the dunnage bag wall.

19. An arrangement according to claim 14 including
- a valve member moveable in said valve stem for closing and opening a passage through said valve stem;
- a spring engaged between said stem and said valve member for normally closing the passage; and
- a valve opening post fixed to said coupling for engaging said valve member when said coupling is coupled to said valve stem to open the passage.

* * * * *